United States Patent
Jeon et al.

(10) Patent No.: US 10,132,991 B2
(45) Date of Patent: Nov. 20, 2018

(54) BACKLIGHT UNIT, DISPLAY DEVICE, AND METHOD OF MANUFACTURING THE DISPLAY DEVICE

(71) Applicant: SAMSUNG DISPLAY CO., LTD., Yongin-si, Gyeonggi-do (KR)

(72) Inventors: Sehee Jeon, Seoul (KR); Youngsu Kim, Gunpo-si (KR); Wonjin Kim, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 90 days.

(21) Appl. No.: 15/240,314

(22) Filed: Aug. 18, 2016

(65) Prior Publication Data

US 2017/0205568 A1    Jul. 20, 2017

(30) Foreign Application Priority Data

Jan. 15, 2016   (KR) .................. 10-2016-0005521

(51) Int. Cl.
    *G02F 1/1333*    (2006.01)
    *F21V 8/00*       (2006.01)
    *G02F 1/1335*    (2006.01)

(52) U.S. Cl.
    CPC ..... *G02B 6/0088* (2013.01); *G02F 1/133308* (2013.01); *G02F 1/133615* (2013.01)

(58) Field of Classification Search
    CPC ....... G02B 6/00; G02B 6/0088; G02F 1/1333; G02F 1/13308; G02F 1/133524; G02F 1/133615; G02F 1/133308
    See application file for complete search history.

(56) References Cited

U.S. PATENT DOCUMENTS

| | | | | |
|---|---|---|---|---|
| 7,609,355 | B2* | 10/2009 | Nouchi ................. | G02F 1/1333 349/113 |
| 9,113,553 | B2* | 8/2015 | An ....................... | H05K 5/0217 |
| 9,366,804 | B2* | 6/2016 | Hsiao ................. | G02F 1/133308 |
| 9,470,920 | B2* | 10/2016 | Hsiao ................. | G02F 1/133308 |
| 9,715,134 | B2* | 7/2017 | Wang ................. | G02F 1/133308 |
| 2010/0033648 | A1* | 2/2010 | Kaganezawa ..... | G02F 1/133305 349/58 |
| 2015/0219324 | A1* | 8/2015 | Kim ................. | G02F 1/133305 349/58 |

FOREIGN PATENT DOCUMENTS

| | | |
|---|---|---|
| KR | 1020080018728 | 2/2008 |
| KR | 1020090122750 | 12/2009 |
| KR | 1020120055426 | 5/2012 |
| KR | 1020130037033 | 4/2013 |
| KR | 1020140007202 | 1/2014 |
| KR | 1020140043968 | 4/2014 |

* cited by examiner

*Primary Examiner* — Peggy Neils
(74) *Attorney, Agent, or Firm* — Cantor Colburn LLP (57) ABSTRACT

A display device includes a display panel which displays an image and is curved with respect to a first direction, a light guide plate disposed under the display panel and curved with respect to the first direction, a light source which provides a light to the light guide plate, a bottom chassis disposed under the light guide plate, and a supporting part disposed between the light guide plate and the bottom chassis and including an upper surface curved with respect to the first direction and a lower surface which is flat.

18 Claims, 9 Drawing Sheets

BACKLIGHT UNIT, DISPLAY DEVICE, AND METHOD OF MANUFACTURING THE DISPLAY DEVICE

This application claims priority to Korean Patent Application No. 10-2016-0005521, filed on Jan. 15, 2016, and all the benefits accruing therefrom under 35 U.S.C. § 119, the content of which in its entirety is herein incorporated by reference.

BACKGROUND

1. Field

The disclosure relates to a backlight unit, a display device, and a method of manufacturing the display device.

2. Description of the Related Art

In recent years, as the market demand for curved display devices other than a flat display device continues to increase, various flexible display devices, such as a curved display device, a rollable display device, a stretchable display device, etc., have been researched. Such a curved display device may include a curved surface, and the curved surface may be provided by bending elements thereof, e.g., a display panel and a light guide plate, which are initially formed in a flat shape.

SUMMARY

In a curved display device, where a curved surface is defined by bending elements thereof, which are initially in a flat shape, a stress is typically applied to the curved surface. As a result, the curved display device may be deformed while being used, and thus a display quality of the curved display device may be deteriorated.

The disclosure provides a backlight unit that is effectively prevented from being deformed or twisted.

The disclosure provides a display device including the backlight unit.

The disclosure provides a method of manufacturing the display device.

Embodiments of the inventive concept provide a display device including a display panel which displays an image and is curved with respect to a first direction, a light guide plate disposed under the display panel and curved with respect to the first direction, a light source which provides a light to the light guide plate, a bottom chassis disposed under the light guide plate, and a supporting part disposed between the light guide plate and the bottom chassis, where the supporting part includes an upper surface curved with respect to the first direction and a lower surface which is flat.

In an embodiment, the display panel may include a first edge extending in a second direction crossing the first direction, a second edge facing the first edge and extending in the second direction, a third edge connected to an end of the first edge and an end of the second edge and curved with respect to the first direction, and a fourth edge connected to an opposing end of the first edge and an opposing end of the second edge and curved with respect to the first direction to be substantially parallel to the third edge.

In an embodiment, each of the display panel, the light guide plate and the upper surface of the supporting part may be curved with respect to a plane defined by the first and second directions about a reference axis substantially parallel to the second direction, and the bottom chassis may include a bottom surface substantially parallel to the plane defined by the first and second directions.

In an embodiment, the supporting part may include a first frame portion extending in the second direction, a second frame portion spaced apart from the first frame portion in the first direction and extending in the second direction, and a connection portion disposed between the first frame portion and the second frame portion and connected to the first frame portion and the second frame portion. In such an embodiment, the light guide plate may be disposed on the connection portion, and an upper surface of the connection portion is curved in the first direction.

In an embodiment, an upper surface of each of the first and second frame portions may be flat.

In an embodiment, the display device may further include a holder part which presses the light guide plate to the bottom chassis. In such an embodiment, the holder part may include a first holder extending in the second direction, covering an edge extending in the second direction of the light guide plate, and coupled to the supporting part and a second holder extending in the second direction, covering an opposing edge extending in the second direction of the light guide plate, and coupled to the supporting part.

In an embodiment, each of the first and second holders may include a first portion covering the edge or the opposing edge extending in the second direction of the light guide plate, a second portion extending from the first portion in a direction toward the bottom chassis, and a third portion extending from the second portion in a direction opposite to the direction in which the first portion extends.

In an embodiment, the supporting part may include a first frame portion extending in the second direction, a second frame portion spaced apart from the first frame portion in the first direction and extending in the second direction, and a plurality of connection portions connected to the first and second frame portions. In such an embodiment, the plurality of connection portions may be disposed spaced apart from each other in the second direction, the light guide plate may be disposed on the plurality of connection portions, and an upper surface of each of the connection portions may be curved with respect to the first direction.

In an embodiment, the supporting part may include a plurality of supporting members each extending in the first direction, the plurality of supporting members may be disposed spaced apart from each other in the second direction, and an upper surface of each of the plurality of supporting members may be curved with respect to the first direction.

In an embodiment, a first distance between a first vertex of the display panel, at which the first edge meets the third edge, and the lower surface of the supporting part may be smaller than a second distance between one position in the third edge and the lower surface of the supporting part, and a third distance between a second vertex of the display panel, at which the second edge meets with the third edge, and the lower surface of the supporting part may be smaller than the second distance.

In an embodiment, a first distance between a first vertex of the display panel, at which the first edge meets the third edge, and the lower surface of the supporting part may be greater than a second distance between one position in the third edge and the lower surface of the supporting part, and a third distance between a second vertex of the display panel, at which the second edge meets with the third edge, and the lower surface of the supporting part may be greater than the second distance.

In an embodiment, the light source may be disposed to face a side surface of the light guide plate extending in the second direction.

In an embodiment, the upper surface of the supporting part may have a first radius of curvature, and a lower surface of the light guide plate may have a second radius of curvature which is substantially the same as the first radius of curvature.

Embodiments of the inventive concept provide a backlight unit including a bottom chassis including a bottom portion substantially parallel to a plane defined a first direction and a second direction crossing the first direction and a sidewall extending from the bottom portion, a supporting part disposed on the bottom portion of the bottom chassis and including a lower surface substantially parallel to the bottom portion and an upper surface curved with respect to the bottom portion about a first reference axis substantially parallel to the second direction, a light guide plate disposed on the supporting part and curved along the upper surface of the supporting part, and a light source unit disposed between the light guide plate and the sidewall of the bottom chassis.

In an embodiment, a radius of curvature of the upper surface of the supporting part may be substantially equal to a radius of curvature of a lower surface of the light guide plate adjacent to the upper surface of the supporting part.

In an embodiment, the supporting part may include a first frame portion extending in the second direction, a second frame portion spaced apart from the first frame portion in the first direction and extending in the second direction, and a connection portion disposed between the first frame portion and the second frame portion and connected to the first frame portion and the second frame portion, the light guide plate is disposed on the connection portion, and an upper surface of the connection portion is curved with respect to the bottom portion about a second reference axis substantially parallel to the second direction.

In an embodiment, the supporting part may include a first frame portion extending in the second direction, a second frame portion spaced apart from the first frame portion in the first direction and extending in the second direction, and a plurality of connection portions connected to the first and second frame portions. In such an embodiment, the plurality of connection portions may be disposed spaced apart from each other in the second direction, the light guide plate may be disposed on the plurality of connection portions, and an upper surface of each of the plurality of connection portions may be curved with respect to the bottom portion about a second reference axis substantially parallel to the second direction.

In an embodiment, the supporting part may include a plurality of supporting members each extending in the first direction, the plurality of supporting members may be disposed spaced apart from each other in the second direction, and an upper surface of each of the plurality of supporting members may be curved with respect to the bottom portion about a second reference axis substantially parallel to the second direction.

Embodiments of the inventive concept provide a method of manufacturing a display device, including providing a bottom chassis including a flat bottom portion, providing a supporting part on the bottom portion, where the supporting part includes a lower surface, which is flat, and an upper surface curved with respect to a first direction, providing a light guide plate on the upper surface of the supporting part, curving the light guide plate along the upper surface of the supporting part, and providing a display panel on the light guide plate.

In an embodiment, the method further includes providing a holder part that presses the light guide plate and couples the supporting part to the bottom chassis.

According to embodiments of the inventive concept as described herein, the light guide plate is curved to correspond to the curved upper surface of the supporting part. In such an embodiment, the supporting part is disposed between the curved light guide plate and the bottom chassis, and the bottom surface of the bottom chassis may be flat. As a result, in such embodiments, the stress, which is caused by a repulsive force of the curved light guide plate that tends to return to its original shape, is distributed by the supporting part, and thus the display device may be effectively prevented from being deformed.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. Like numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, exemplary embodiments of the invention will be described in detail with reference to the accompanying drawings.

Figure 1:
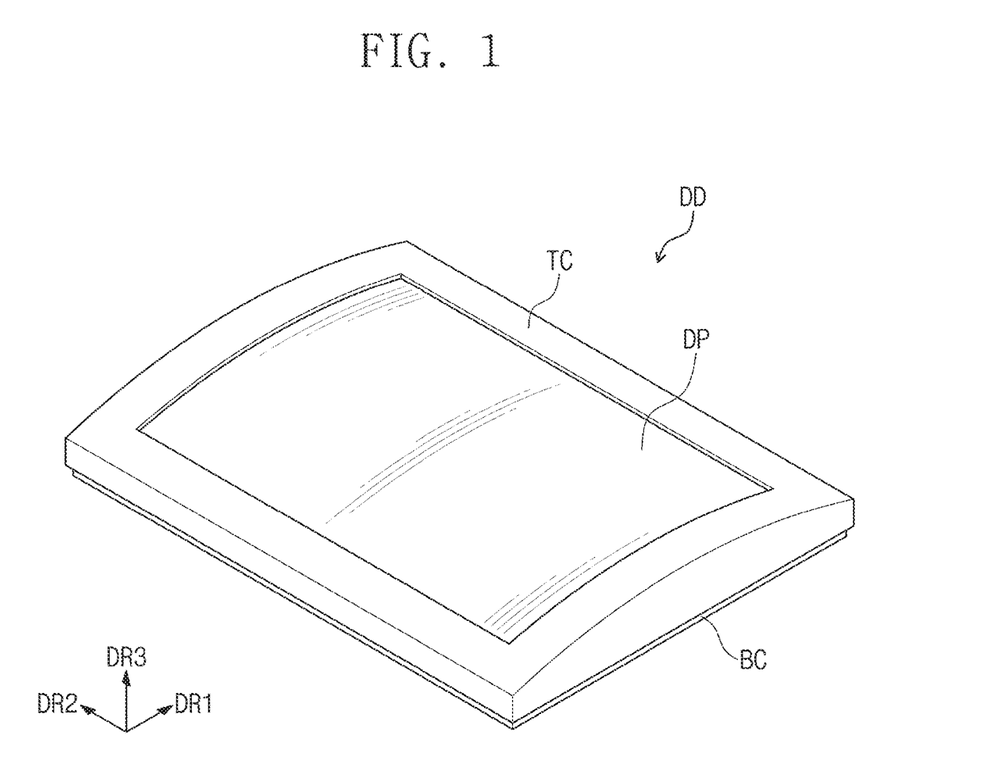
FIG. 1 is a perspective view showing a display device according to an exemplary embodiment of the disclosure.

FIG. 1 is a perspective view showing a display device DD according to an exemplary embodiment of the disclosure.

Referring to FIG. 1, an exemplary embodiment of the display device DD may be applied to various electronic devices, such as a center information display ("CID") for a car, a wrist-type electronic device, a personal digital assistant, a portable multimedia player, a game unit, a tablet PC, a smart phone, a large-sized electronic item, e.g., a television set, an outdoor billboard, etc., and a small and medium-sized electronic item, e.g., a personal computer, a notebook computer, a car navigation unit, a camera, etc., but it should not be limited thereto or thereby.

Figure 2:
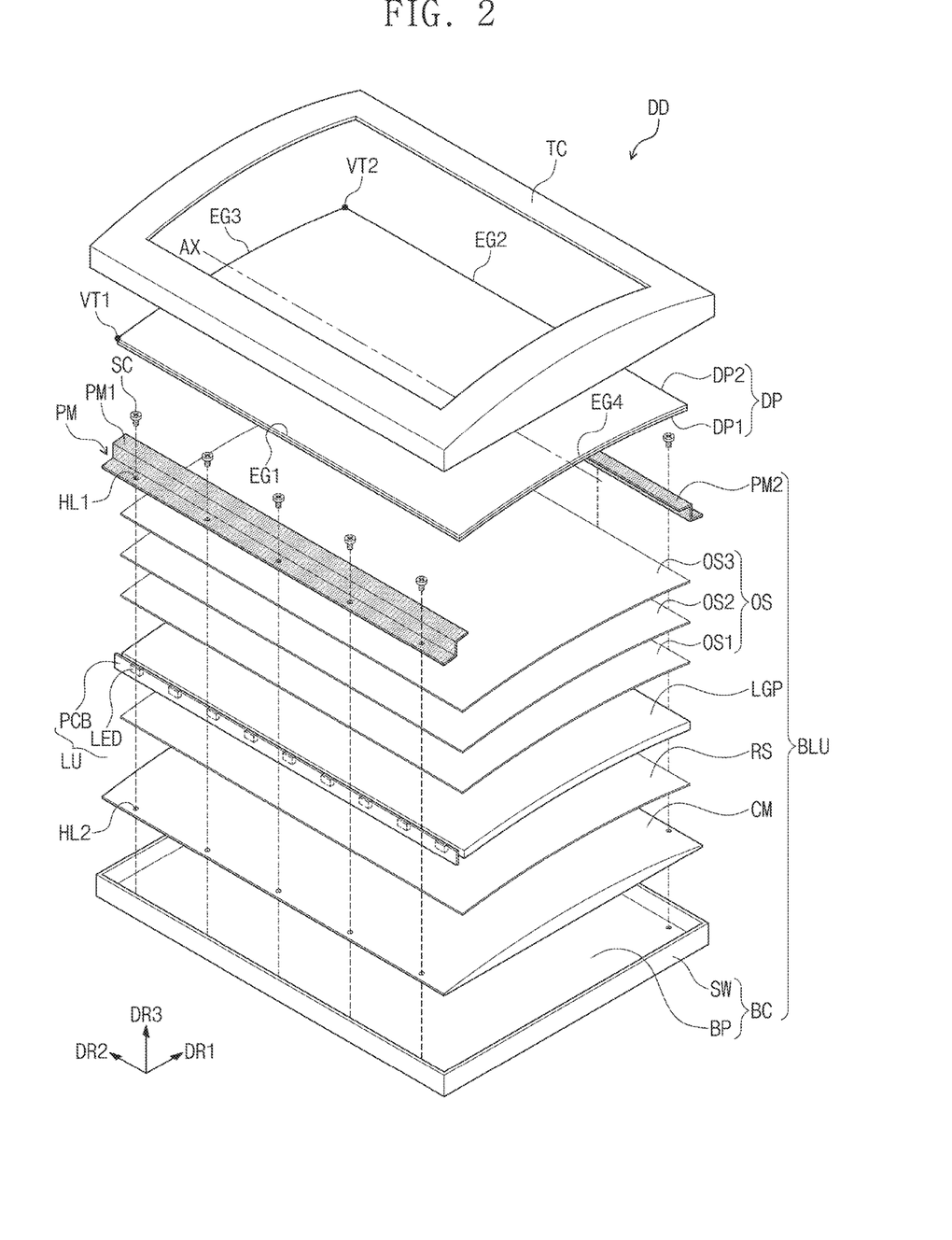
FIG. 2 is an exploded perspective view showing a display device according to an exemplary embodiment of the disclosure.
Figure 3:
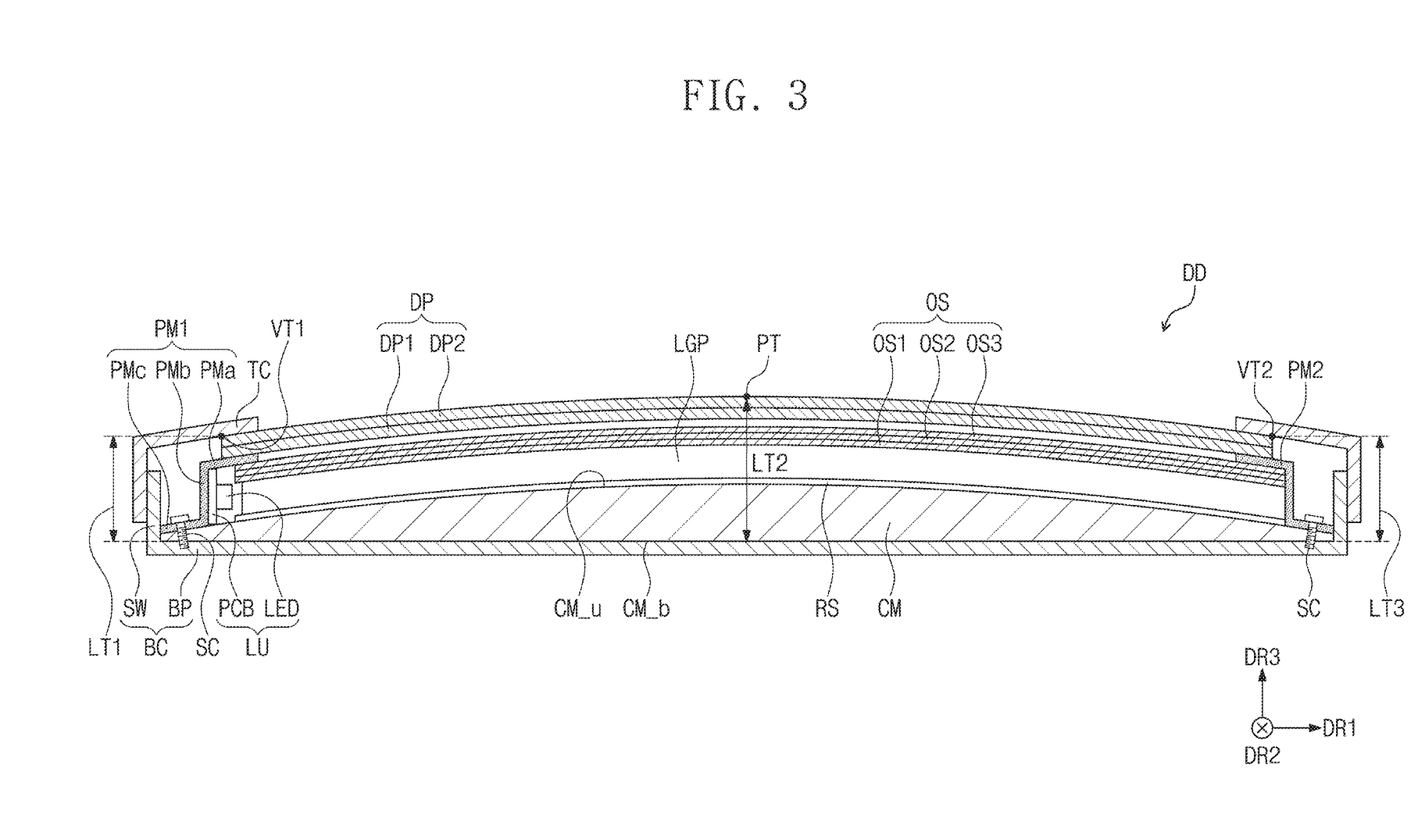
FIG. 3 is a cross-sectional view showing a display device according to an exemplary embodiment of the disclosure.

FIG. 2 is an exploded perspective view showing a display device DD according to an exemplary embodiment of the disclosure, and FIG. 3 is a cross-sectional view showing a display device DD according to an exemplary embodiment of the disclosure.

Referring to FIGS. 2 and 3, an exemplary embodiment of the display device DD includes a display panel DP, a top chassis TC, and a backlight unit BLU.

The display panel DP displays an image corresponding to image data input thereto. In an exemplary embodiment, the display panel DP may be, but not limited to, a liquid crystal display panel, a plasma display panel, an electrophoretic display panel, or an electrowetting display panel. Hereinafter, for convenience of description, an exemplary embodiment, where the display panel DP is the liquid crystal display panel, will be described in detail.

In such an embodiment, the display panel DP includes a first substrate DP1, a second substrate DP2 facing the first substrate DP1, and a liquid crystal layer (not shown) disposed between the first substrate DP1 and the second substrate DP2. The liquid crystal layer includes liquid crystal molecules aligned in accordance with an electric field formed between the first substrate DP1 and the second substrate DP2. Although not shown separately, polarizing plates may be respectively disposed on and under the display panel DP, or on outer surfaces of the display panel DP, respectively.

The display panel DP may be curved in a first direction DR1. The display panel DP includes a display surface curved with respect to a plane defined by a first direction DR1 and a second direction DR2 about a reference axis AX substantially parallel to the second direction DR2 crossing the first direction DR1.

The display panel DP includes a first edge EG1 extending in the second direction DR2, a second edge EG2 facing the first edge EG1 and extending in the second direction DR2, a third edge EG3 extending from an end (or a first end) of the first edge EG1 to an end (or a first end) of the second edge EG2 and curved with respect to the first direction DR1, e.g., curved about an axis in the first direction, and a fourth edge EG4 extending from an opposing end (or a second end opposite to the first end) of the first edge EG1 to an opposing end (or a second end opposite to the first end) of the second edge EG2 curved with respect to the first direction DR1, e.g., curved about an axis in the first direction, to be substantially parallel to the third edge EG3. The third edge EG3 is connected between the end of the first edge EG1 and the end of the second edge EG2, and the fourth edge EG4 is connected between the opposing end of the first edge EG1 and the opposing end of the second edge EG2.

In an exemplary embodiment, the display device DD includes a convex display surface having a center portion protruded to the third direction DR3. Hereinafter, a position at which the first edge EG1 meets the third edge EG3 is referred to as a first vertex VT1, a position at which the second edge EG2 meets the third edge EG3 is referred to as a second vertex VT2, and one position PT is defined in the third edge EG3. In an exemplary embodiment, a distance LT1 between the first vertex VT1 and a lower surface CM_b of a supporting part CM is smaller than a second distance LT2 between the one position PT and the lower surface CM_b. In An exemplary embodiment, a third distance LT3 between the second vertex VT2 and the lower surface CM_b is smaller than the second distance LT2. Accordingly, a user may see the image displayed on the convex display surface.

The display surface of the display panel DP includes a display area and a non-display area. The display area displays an image, and the non-display area surrounds the display area and does not display an image. The top chassis TC covers the non-display area and is coupled to the backlight unit BLU. In an alternative exemplary embodiment, the top chassis TC may be omitted, and the display panel DP may be coupled to a part of the backlight unit BLU by a member having an adhesive property.

The backlight unit BLU includes a bottom chassis BC, a supporting part CM, a light guide plate LGP, a light source unit LU, optical sheets OS, and a holder part PM.

The bottom chassis BC includes a bottom surface BP and a sidewall SW extending from the bottom surface BP. The bottom surface BP has a substantially flat shape.

The supporting part CM is disposed on the bottom surface BP of the bottom chassis BC. The supporting part CM includes an upper surface CM_u curved with respect to the first direction DR1 and the lower surface CM_b that is flat. The upper surface CM_u of the supporting part CM is curved with respect to a plane defined by the first and second directions DR1 and DR2 about a reference axis (not shown) substantially parallel to the second direction DR2. The supporting part CM is disposed on the bottom surface of the bottom chassis BC in a way such that the lower surface CM_b of the supporting part CM is disposed between the bottom surface BP of the bottom chassis BC and the upper surface CM_u of the supporting part CM.

In an exemplary embodiment, the lower surface CM_b of the supporting part CM has the same flat shape as the bottom surface BP of the bottom chassis BC, but it should not be limited thereto or thereby. In one alternative exemplary embodiment, for example, the lower surface CM_b of the supporting part CM may have a recessed shape, and in such an embodiment, a weight of the display device DD may be reduced.

The light guide plate LGP is disposed on the supporting part CM. The light guide plate LGP is curved to correspond to the curved shape of the upper surface CM_u of the supporting part CM. In an exemplary embodiment, the light guide plate LGP may be deformed to have the curved shape by pressing the light guide plate LGP along the curved shape of the upper surface CM_u of the supporting part CM while being coupled to the upper surface CM_u of the supporting part CM. Therefore, in such an embodiment, a radius of curvature of the upper surface CM_u of the supporting part CM may be substantially equal to (or equal to about) a radius of curvature of the lower surface of the light guide plate LGP.

In a conventional display device where the bottom surface of the bottom chassis is curved, when the light guide plate LGP is pressed onto a curved bottom surface (not shown) and curved along the curvature of the curved bottom surface BP of the bottom chassis, a weight may be applied to the curved bottom chassis (not shown). The curvature of the bottom surface of the bottom chassis applied with the weight may not be effectively maintained, and the curvature of the bottom chassis may not be maintained by a repulsion force of the curved light guide plate LGP that tends to return to its original shape after the light guide plate is assembled with the bottom chassis. Thus, the backlight unit BLU may be continuously applied with stress and thereby be deformed after the display device DD is completely assembled. However, according to an exemplar embodiment, the bottom surface BP of the bottom chassis BC is flat, and the supporting part CM having the curved upper surface CM_u is disposed on the bottom surface BP. In such an embodiment, the light guide plate LGP is curved along the upper surface CM_u of the supporting part CM. In such an embodiment, the upper surface CM_u of the supporting part CM may have the curved shape formed and defined by an injection or extrusion molding process other than the shape obtained by curving the flat surface. Accordingly, the shape of the supporting part CM may be effectively maintained even though the repulsion force of the light guide plate LGP is applied to the supporting part CM. The stress is distributed by the supporting part CM disposed between the flat bottom surface BP and the curved light guide plate LGP, and as a result, the backlight unit BLU may be effectively prevented from being deformed.

In an exemplary embodiment, a reflective sheet RS is disposed between the supporting part CM and the light guide plate LGP. The reflective sheet RS reflects the light leaking from the light guide plate LGP such that the leaked light is re-incident to the light guide plate LGP. In an alternative exemplary embodiment, the reflective sheet RS may be omitted. In one alternative exemplary embodiment, for example, the reflective sheet RS is omitted and a light reflective material may be coated on the supporting part CM. In such an embodiment, the light reflective material should not be limited to a specific material.

The light source unit LU is disposed close or adjacent to a side (e.g., on a side surface) of the light guide plate LGP. The light source unit LU includes a light source LED and a printed circuit board PCB. The light source LED is disposed or mounted on the printed circuit board PCB to receive a driving voltage from the printed circuit board PCB. The light source LED provides a light to the light guide plate LGP in response to the driving voltage.

The optical sheets OS are disposed between the light guide plate LGP and the display panel DP. The optical sheets OS are curved with a curvature corresponding to the curvature of the upper portion of the light guide plate LGP. The optical sheets OS control a path of the light guided by the light guide plate LGP. The optical sheets OS may include a diffusion sheet OS1, a prism sheet OS2, and a protective sheet OS3.

The diffusion sheet OS1 diffuses the light, and the prism sheet OS2 condenses the light such that the light diffused by the diffusion sheet OS1 travels in a direction closer to a normal line direction of the display panel DP. The protective sheet OS3 protects the prism sheet OS2 from external impacts. In one exemplary embodiment, for example, the optical sheets OS include a single diffusion sheet OS1, a single prism sheet OS2, and a single protective sheet OS3, but they should not be limited thereto or thereby. In an alternative exemplary embodiment, at least one of the diffusion sheet OS1, the prism sheet OS2, and the protective sheet OS3 may be provided in a plural number, or one or more of the diffusion sheet OS1, the prism sheet OS2, and the protective sheet OS3 may be omitted from the optical sheets OS. In an exemplary embodiment, the light guide plate LGP may include a pattern defined therein to perform functions of the optical sheets OS.

In an exemplary embodiment, the holder part PM includes a first holder PM1 and a second holder PM2. Each of the first and second holders PM1 and PM2 extends in the second direction DR2. The first holder PM1 is disposed under the first edge EG1 of the display panel DP, and the second holder PM2 is disposed under the second edge EG2 of the display panel DP.

Each of the first and second holders PM1 and PM2 presses the optical sheets OS and the light guide plate LGP and couples the supporting part CM to the bottom chassis BC. The first and second holders PM1 and PM2 have substantially the same shape as each other, and thus the first holder PM1 will now be described in detail and any repetitive detailed description of the second holder PM2 will be omitted for convenience of description.

In an exemplary embodiment, the first holder PM1 includes a first portion PMa disposed to cover an edge of the light guide plate LGP extending along the second direction DR2, a second portion PMb extending from the first portion PMa to the bottom chassis BC, and a third portion PMc extending from the second portion PMb to a direction opposite to the direction in which the first portion PMa extends.

The second portion PMb has a shape extending in the third direction DR3 corresponding to a thickness direction of the display device DD, the first portion PMa has a shape bent from one end of the second portion PMb in the third direction DR3 (e.g., an upper end of the second portion PMb) and extending in the first direction DR1, and the third portion PMc has a shape bent from the other end of the second portion PMb in the third direction DR3 (e.g., a lower end of the second portion PMb) and extending in the direction opposite to the first direction DR1. The first holder PM1 may have a step-like shape.

The third portion PMc is disposed on the supporting part CM. In an exemplary embodiment, as shown in FIGS. 2 and 3, the third portion PMc may be coupled to the bottom chassis BC by a screw SC. In such an embodiment, a hole HL1, through which the screw SC penetrates may be defined in the third portion PMc, and a hole HL2, through which the screw SC penetrates, is defined in the supporting part CM. FIG. 2 shows an embodiment, where five screws SC are used to couple the third portion PMc and the bottom chassis BC to each other, but the number of the screws SC should not be limited to five. The number of the screws SC may be determined depending on a size of the display device DD and the radius of curvature of the light guide plate LGP.

In an exemplary embodiment, at least one of the first and second holders PM1 and PM2 is coupled to the light source unit LU. The light source unit LU may be coupled to the second portion PMb of the at least one of the first and second holders PM1 and PM2. In an exemplary embodiment, the light source unit LU and the second portion PMb are coupled to each other by an adhesive material, a screw, or a clip member, for example. In an exemplary embodiment, as shown in FIG. 3, the light source unit LU is coupled to the first holder PM1, but it should not be limited thereto or thereby. In one alternative exemplary embodiment, for example, the light source unit LU may be provided to not only the first holder PM1, but also the second holder PM2, and thus the light source units LU provide the light to the light guide plate LGP at both ends of the light guide plate LGP.

In an exemplary embodiment, each of the first and second holders PM1 and PM2 includes a light blocking material to effectively prevent a light leakage from occurring in the area to which the light is incident. In one exemplary embodiment, for example, the first holder PM1 or the second holder PM2, which is coupled to the light source unit LU, may be coated with a light reflective material or a light absorbing material, or may be formed using material including the light reflective material or the light absorbing material.

Figure 4A:
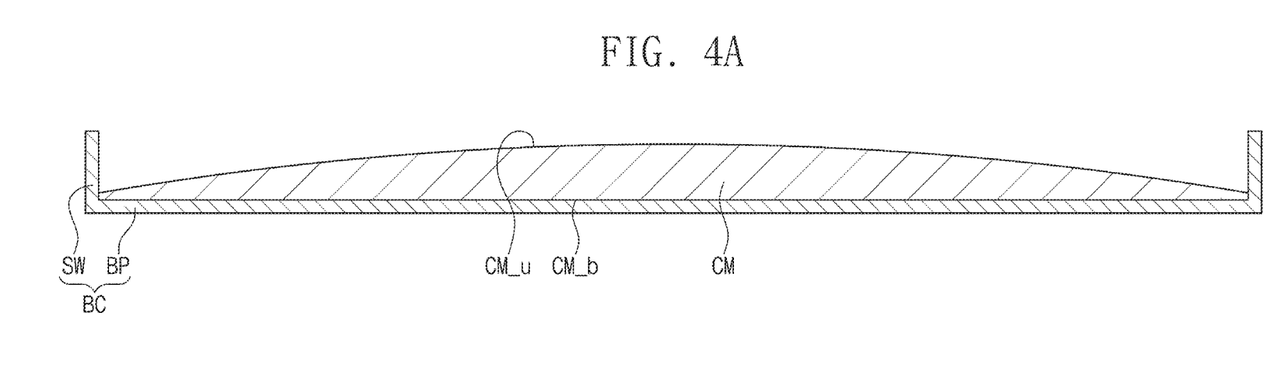
FIGS. 4A to 4C are cross-sectional views showing a manufacturing method of a display device according to an exemplary embodiment of the disclosure.
Figure 4B:
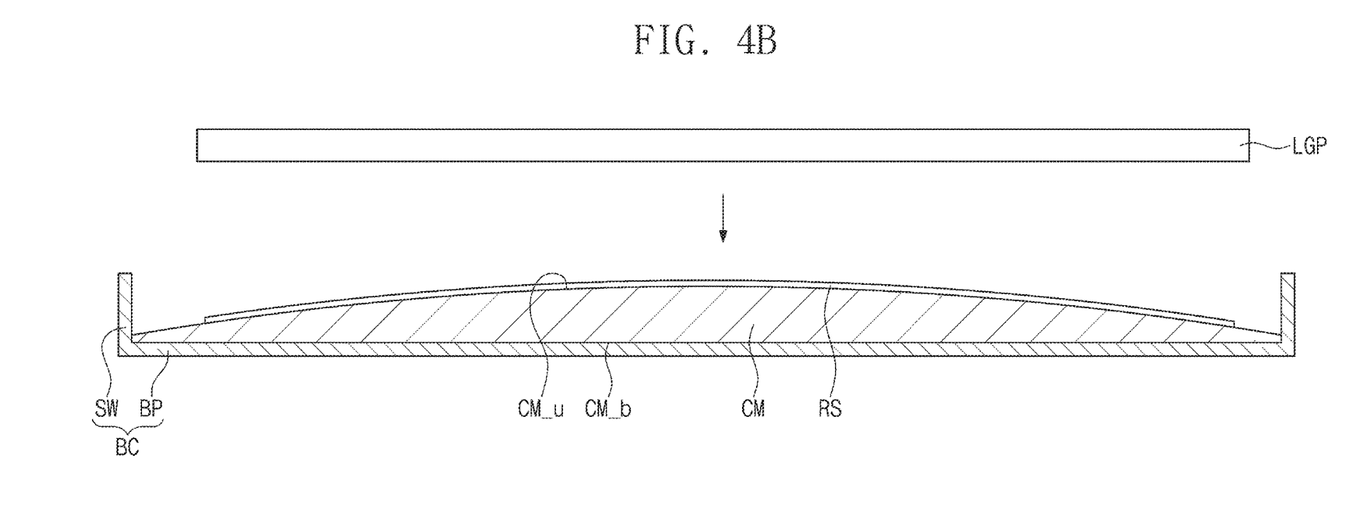
Figure 4C:
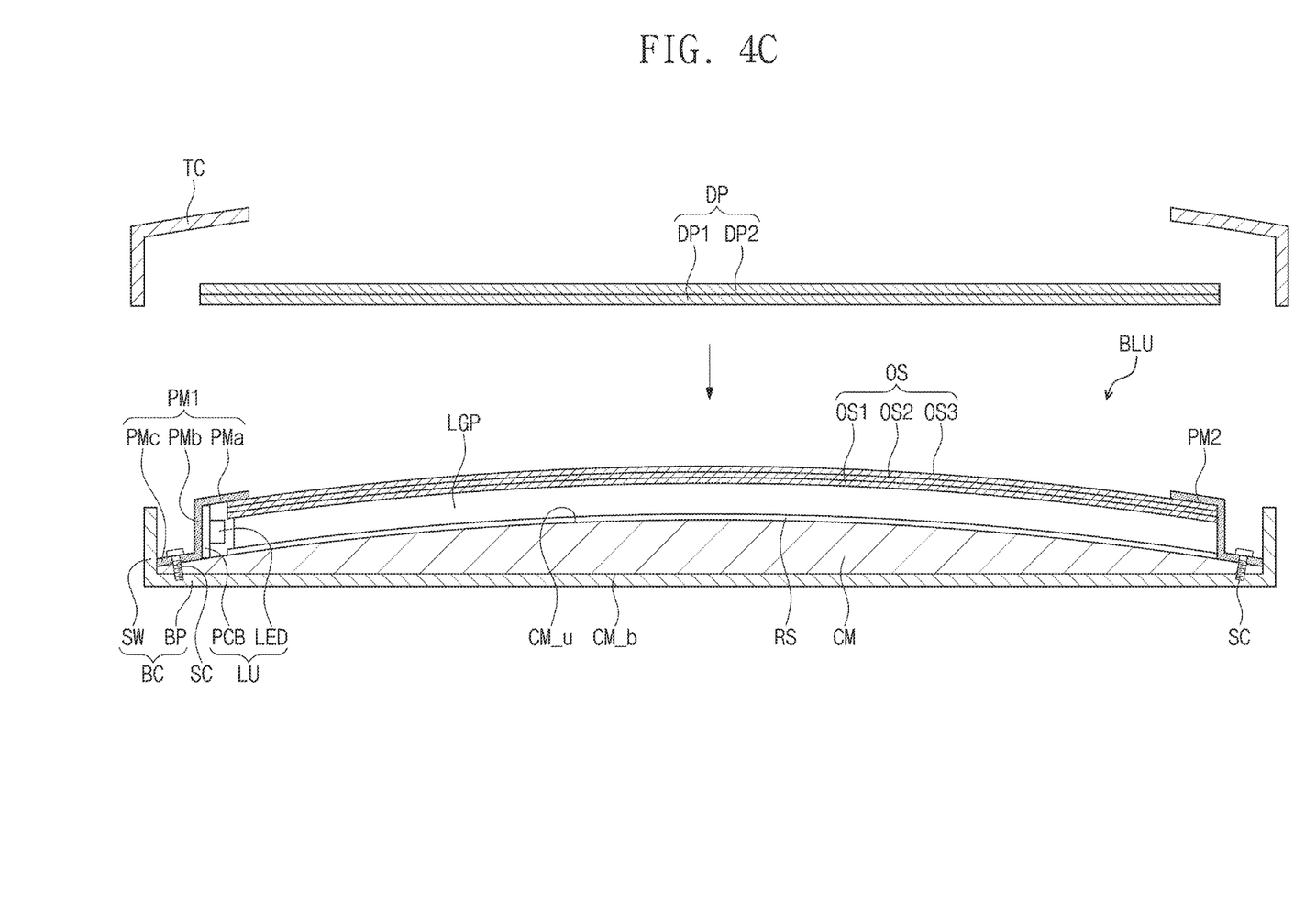

FIGS. 4A to 4C are cross-sectional views showing a manufacturing method of the display device DD according to an exemplary embodiment of the disclosure.

Referring to FIGS. 4A to 4C, an exemplary embodiment of the manufacturing method of the display device DD will hereinafter be described. In such an embodiment, the bottom chassis BC having the flat bottom surface BP is prepared. The supporting part CM including the flat lower surface CM_b and the curved upper surface CM_u is disposed on the bottom surface BP of the bottom chassis BC. The supporting part CM may be formed by the injection or extrusion molding process. The reflective sheet RS is disposed on the supporting part CM. In an exemplary embodiment, where the reflective sheet RS is omitted from the display device DD, the process of placing the reflective sheet on the supporting part CM may be omitted.

In an exemplary embodiment, after the light guide plate LGP in the flat state is placed on the supporting part CM, the light guide plate LGP is curved to correspond to the shape of the upper surface CM_u of the supporting part CM. According to an exemplary embodiment, since the bottom chassis BC includes the flat bottom surface BP, the bottom chassis BC may not be substantially deformed even though the flat light guide plate LGP placed on the supporting part CM is pressed to be curved. In such an embodiment, although the repulsive force of the light guide plate LGP is applied to the supporting part CM to return to its original shape after the display device DD is assembled, the stress caused by the repulsive force may be distributed by the supporting part CM disposed between the light guide plate LGP and the bottom chassis BC. Therefore, the display device DD (refer to FIG. 2) may be effectively prevented from being deformed or twisted after the assembling of the display device DD.

After providing the light source unit LU on the side surface of the light guide plate LGP and providing the optical sheets OS on the upper surface of the light guide plate LGP, one edge of the curved light guide plate LGP is pressed by the first holder PM1, and the other edge of the curved light guide plate LGP facing the one edge is pressed by the second holder PM2. Accordingly, the backlight unit BLU is assembled.

The display panel DP in the flat state is disposed on the assembled backlight unit BLU, and then the display panel DP is curved. However, according to an alternative exemplary embodiment, the display panel DP may be manufactured to have the curvature. In such an embodiment, the curved display panel DP may be coupled to the backlight unit BLU (refer to FIG. 2).

Figure 5:
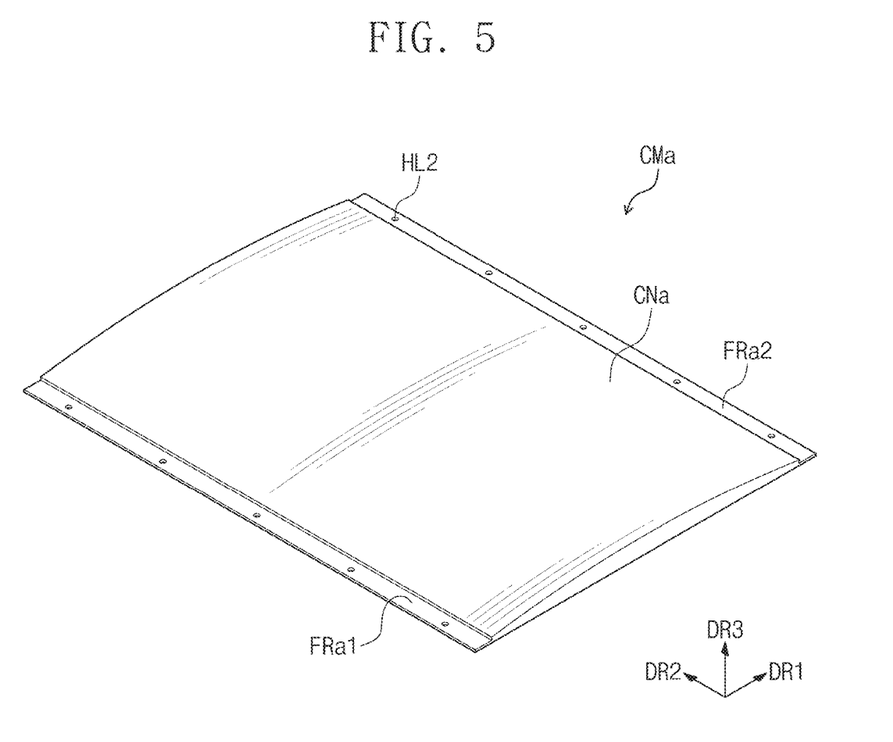
FIG. 5 is a perspective view showing a supporting part according to an exemplary embodiment of the disclosure.

FIG. 5 is a perspective view showing a supporting part CMa according to an exemplary embodiment of the disclosure.

Referring to FIGS. 2 and 5, an exemplary embodiment of the supporting part CMa includes a first frame portion FRa1, a second frame portion FRa2, and a connection portion CNa.

Each of the first and second frame portions FRa1 and FRa2 extends in the second direction DR2, and the first and second frame portions FRa1 and FRa2 are spaced apart from each other in the first direction DR1. The connection portion CNa is disposed between the first frame portion FRa1 and the second frame portion FRa2 and connected to the first frame portion FRa1 and the second frame portion FRa2.

In an exemplary embodiment, an upper surface of the connection portion CNa is curved along the first direction, and an upper surface of each of the first and second frame portions FRa1 and FRa2 has a flat shape. The light guide plate LGP is disposed on the upper surface of the connection portion CNa and has a curved shape. In such an embodiment, the holder part PM may be disposed on the upper surface of each of the first and second frame portions FRa1 and FRa2, such that the holder part PM may be effectively coupled to the supporting part CMa.

Figure 6:
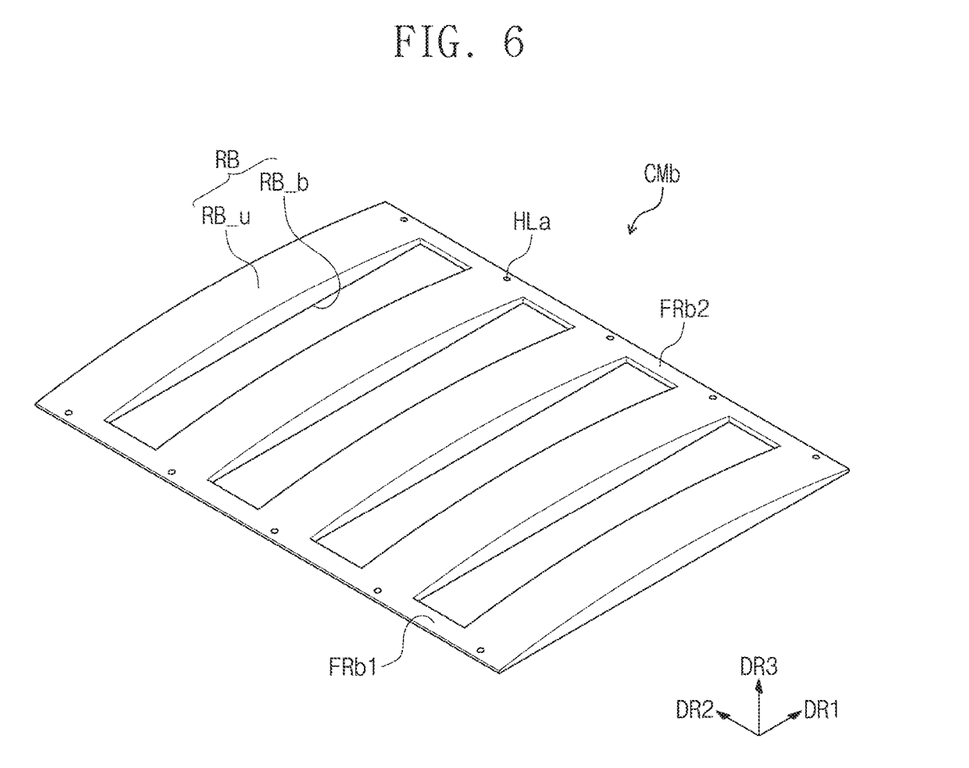
FIG. 6 is a perspective view showing a supporting part according to an alternative exemplary embodiment of the disclosure.

FIG. 6 is a perspective view showing a supporting part CMb according to an alternative exemplary embodiment of the disclosure.

Referring to FIGS. 2 and 6, an exemplary embodiment of the supporting part CMb includes a first frame portion FRb1, a second frame portion FRb2, and a plurality of connection portions RB.

Each of the first and second frame portions FRb1 and FRb2 extends in the second direction DR2, and the first and second frame portions FRb1 and FRb2 are spaced apart from each other in the first direction DR1. The connection portions RB are disposed between the first frame portion FRb1 and the second frame portion FRb2 and connected to the first frame portion FRb1 and the second frame portion FRb2.

Among the connection portions RB, two connection portions adjacent to each other are spaced apart from each other in the second direction DR2. In such an embodiment, where two adjacent connection portions are spaced apart from each other, an empty space is defined between the two connection portions adjacent to each other, such that a weight of the supporting part CMb is reduced.

In such an embodiment, as shown in FIG. 6, a thru-hole HLa through which a screw SC penetrates is defined in each of the first and second frame portions FRb1 and FRb2. In an exemplary embodiment, as shown in FIG. 6, the thru-holes HLa are disposed to face each other such that the connection portions RB are disposed between the thru-holes HLa, but the positions of the thru-holes HLa should not be limited thereto or thereby as long as the thru-holes HLa are defined through the first and second frame portions FRb1 and FRb2.

Figure 7:
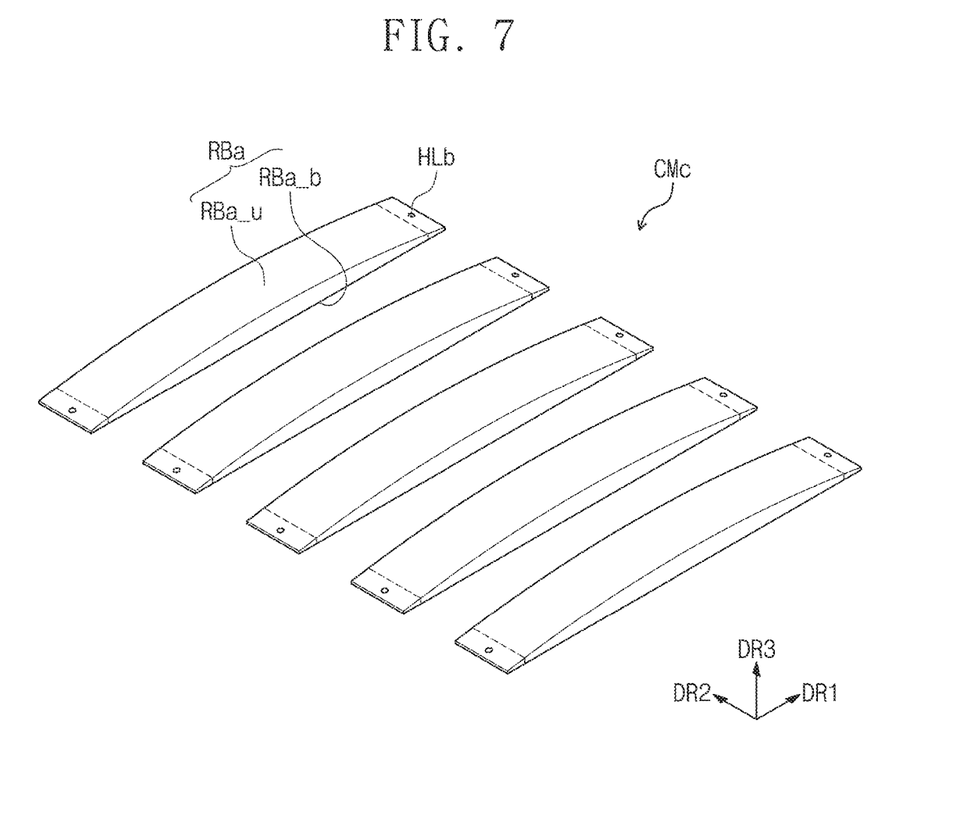
FIG. 7 is a perspective view showing a supporting part according to another alternative exemplary embodiment of the disclosure.

FIG. 7 is a perspective view showing a supporting part CMc according to another alternative exemplary embodiment of the disclosure.

Referring to FIG. 7, an exemplary embodiment of the supporting part CMc includes a plurality of supporting members RBa. Each of the supporting members RBa extends in the first direction DR1. Each of the supporting members RBa includes a flat lower surface RBa_b and a curved upper surface RBa_u. Holes HLb are respectively defined through both ends of each of the supporting members RBa, and screws SC respectively penetrate through the holes HLb. In an exemplary embodiment, as shown in FIG. 7, among the supporting members RBa, two supporting members adjacent to each other are spaced apart from each other in the second direction DR2. In an alternative exemplary embodiment, the supporting members RBa may be disposed adjacent to each other without gaps between the supporting members RBa as similar to that shown in FIG. 2.

According to an exemplary embodiment, the supporting members RBa are not integrally formed as a single unit, but independently separable from each other. Accordingly, the number of the supporting members RBa may be controlled in consideration of size and weight of products.

Figure 8:
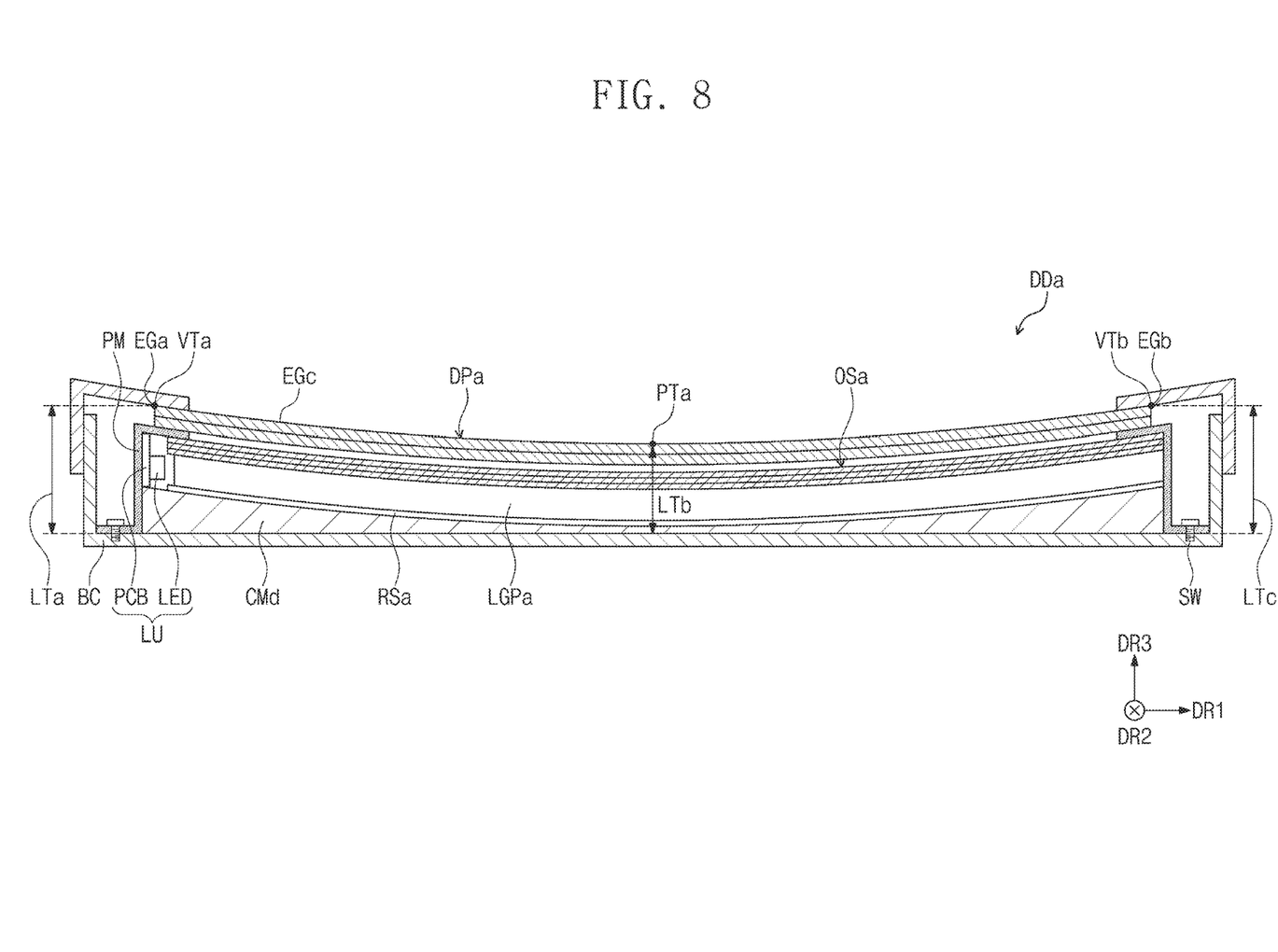
FIG. 8 is a cross-sectional view showing a display device according to an alternative exemplary embodiment of the disclosure.

FIG. 8 is a cross-sectional view showing a display device DDa according to an alternative exemplary embodiment of the disclosure.

Referring to FIG. 8, an exemplary embodiment of the display device DDa provides the user with a concave display surface in which two edges EGa and EGb spaced apart from each other in the first direction DR1 are protruded in the third direction DR3. Hereinafter, a position at which a first edge EGa meets a third edge EGc is referred to as a first vertex VTa, a position at which a second edge EGb meets the third edge EGc is referred to as a second vertex VTb, and one position PTa is defined in the third edge EGc.

In such an embodiment, a distance LTa between the first vertex VTa and a lower surface of a supporting part CMd is greater than a second distance LTb between the one position PTa and the lower surface of the supporting part CMd. In such an embodiment, a third distance LTc between the second vertex VTb and the lower surface of the supporting part CMd is greater than the second distance LTb. Accordingly, the user may see the image displayed on the concave display surface.

Each of a display panel DPa, optical sheets OSa, a light guide plate LGPa, and a reflective sheet RSa includes two edges spaced apart from each other in the first direction DR2 and protruded to the third direction DR3. Each of the display panel DPa, the optical sheets OSa, the light guide plate LGPa, and the reflective sheet RSa is curved with respect to the first direction DR1.

A supporting part CMd is disposed between the light guide plate LGPa and the bottom chassis BC having the flat bottom surface. An upper surface of the supporting part CMd is curved in a direction different from that of the supporting part CM shown in FIG. 2. The upper surface of the supporting part CMd has a shape corresponding to that of the light guide plate LGPa. Accordingly, the both ends of the supporting part CMd have a thickness greater than a thickness of a center portion of the supporting part CMd when viewed in a cross-section.

According to an exemplary embodiment, although the repulsive force of the light guide plate LGPa is applied to the supporting part CMd to return to its original shape, the shape of the supporting part CMd may be maintained. The stress is distributed by the supporting part CMd disposed between the flat bottom chassis BC and the curved light guide plate LGPa, and as a result the backlight unit BLU may be effectively prevented from being deformed.

Although some exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a display panel which displays an image and is curved with respect to a first direction;
    a light guide plate disposed under the display panel and curved with respect to the first direction;
    a light source which provides a light to the light guide plate;
    a bottom chassis disposed under the light guide plate; and
    a supporting part disposed between the light guide plate and the bottom chassis, wherein the supporting part comprises:
    an upper surface curved with respect to the first direction;
    a lower surface which is flat; and
    a holder part comprising a first holder part and a second holder part, wherein each of the first and second holder parts comprises:
        a first portion covering an edge extending in a second direction crossing the first direction of the light guide plate;
        a second portion extending from the first portion in a direction toward the bottom chassis; and
        a third portion extending from the second portion in a direction opposite to the direction in which the first portion extends from the second portion.

2. The display device of claim 1, wherein the display panel comprises:
    a first edge extending in the second direction;
    a second edge facing the first edge and extending in the second direction;

a third edge connected to an end of the first edge and an end of the second edge and curved with respect to the first direction; and a fourth edge connected to an opposing end of the first edge and an opposing end of the second edge and curved with respect to the first direction to be substantially parallel to the third edge.

3. The display device of claim 2, wherein each of the display panel, the light guide plate and the upper surface of the supporting part is curved with respect to a plane defined by the first and second directions about a reference axis substantially parallel to the second direction, and the bottom chassis comprises a bottom surface substantially parallel to the plane defined by the first and second directions.

4. The display device of claim 2, wherein the supporting part comprises:

a first frame portion extending in the second direction;

a second frame portion spaced apart from the first frame portion in the first direction and extending in the second direction; and a connection portion disposed between the first frame portion and the second frame portion and connected to the first frame portion and the second frame portion, wherein the light guide plate is disposed on the connection portion, and an upper surface of the connection portion is curved in the first direction.

5. The display device of claim 4, wherein an upper surface of each of the first and second frame portions is flat.

6. The display device of claim 4, wherein the first holder part and the second holder part are spaced apart in the first direction, wherein the first holder part extending in the second direction, and coupled to the supporting part; and wherein the second holder part extending in the second direction, and coupled to the supporting part.

7. The display device of claim 2, wherein the supporting part comprises:

a first frame portion extending in the second direction;

a second frame portion spaced apart from the first frame portion in the first direction and extending in the second direction; and a plurality of connection portions connected to the first and second frame portions, wherein the plurality of connection portions are disposed spaced apart from each other in the second direction, the light guide plate is disposed on the connection portions, and an upper surface of each of the plurality of connection portions is curved with respect to the first direction.

8. The display device of claim 2, wherein the supporting part comprises a plurality of supporting members, wherein each of the plurality of supporting members extends in the first direction, the plurality of supporting members are disposed spaced apart from each other in the second direction, and an upper surface of each of the plurality of supporting members is curved with respect to the first direction.

9. The display device of claim 2, wherein a first distance between a first vertex of the display panel, at which the first edge meets the third edge, and the lower surface of the supporting part is smaller than a second distance between one position in the third edge and the lower surface of the supporting part, and a third distance between a second vertex of the display panel, at which the second edge meets with the third edge, and the lower surface of the supporting part is smaller than the second distance.

10. The display device of claim 2, wherein a first distance between a first vertex of the display panel, at which the first edge meets the third edge, and the lower surface of the supporting part is greater than a second distance between one position in the third edge and the lower surface of the supporting part, and a third distance between a second vertex of the display panel, at which the second edge meets with the third edge, and the lower surface of the supporting part is greater than the second distance.

11. The display device of claim 2, wherein the light source is disposed to face a side surface of the light guide plate extending in the second direction.

12. The display device of claim 1, wherein the upper surface of the supporting part has a first radius of curvature, and a lower surface of the light guide plate has a second radius of curvature which is substantially the same as the first radius of curvature.

13. A backlight unit comprising:

a bottom chassis comprising:

a bottom portion substantially parallel to a plane defined in a first direction and a second direction crossing the first direction; and a sidewall extending from the bottom portion;

a supporting part disposed on the bottom portion of the bottom chassis and comprising:

a lower surface substantially parallel to the bottom portion; and an upper surface curved with respect to the bottom portion about a first reference axis substantially parallel to the second direction;

a light guide plate disposed on the supporting part and curved along the upper surface of the supporting part; and a light source unit disposed between the light guide plate and the sidewall of the bottom chassis, wherein a length of the lower surface of the supporting part in the first direction is larger than a length of a lower surface of the light guide plate in the first direction.

14. The backlight unit of claim 13, wherein a radius of curvature of the upper surface of the supporting part is substantially equal to a radius of curvature of the lower surface of the light guide plate adjacent to the upper surface of the supporting part.

15. The backlight unit of claim 13, wherein the supporting part comprises:

a first frame portion extending in the second direction;

a second frame portion spaced apart from the first frame portion in the first direction and extending in the second direction; and a connection portion disposed between the first frame portion and the second frame portion and connected to the first frame portion and the second frame portion, wherein the light guide plate is disposed on the connection portion, and an upper surface of the connection portion is curved with respect to the bottom portion about a second reference axis substantially parallel to the second direction.

16. The backlight unit of claim 13, wherein the supporting part comprises:
- a first frame portion extending in the second direction;
- a second frame portion spaced apart from the first frame portion in the first direction and extending in the second direction; and
- a plurality of connection portions connected to the first and second frame portions, wherein the plurality of connection portions are disposed spaced apart from each other in the second direction, the light guide plate is disposed on the plurality of connection portions, and an upper surface of each of the plurality of connection portions is curved with respect to the bottom portion about a second reference axis substantially parallel to the second direction.

17. The backlight unit of claim 13, wherein the supporting part comprises a plurality of supporting members each extending in the first direction, the plurality of supporting members are disposed spaced apart from each other in the second direction, and an upper surface of each of the plurality of supporting members is curved with respect to the bottom portion about a second reference axis substantially parallel to the second direction.

18. A method of manufacturing a display device, the method comprising:
- providing a bottom chassis comprising a flat bottom portion;
- providing a supporting part on the flat bottom portion, wherein the supporting part comprises a lower surface, which is flat, and an upper surface curved with respect to a first direction;
- providing a light guide plate on the upper surface of the supporting part;
- curving the light guide plate along the upper surface of the supporting part;
- providing a holder part to presses the light guide plate and couples the supporting part to the bottom chassis; and
- providing a display panel on the light guide plate, wherein the holder part comprises:
- a first portion covering an edge extending in a second direction crossing the first direction of the light guide plate;
- a second portion extending from the first portion in a direction toward the bottom chassis; and
- a third portion extending from the second portion in a direction opposite to the direction in which the first portion extends from the second portion.

* * * * *